United States Patent [19]
Brow

[11] 3,958,797
[45] May 25, 1976

[54] PIE BOARD

[76] Inventor: George F. Brow, 70 Sierra Way, West Yarmouth, Mass. 02783

[22] Filed: Dec. 26, 1974

[21] Appl. No.: 536,444

[52] U.S. Cl. .............................. 269/302.1; 425/183
[51] Int. Cl.² ........................................ A47J 43/00
[58] Field of Search ............... 269/289, 302.1, 130; 425/183

[56] References Cited
UNITED STATES PATENTS

| 179,748 | 7/1876 | Weed | 269/289 X |
| 374,623 | 12/1887 | Pease | 269/130 X |
| 1,242,610 | 10/1917 | Sindelar | 269/130 X |
| 2,183,767 | 12/1939 | Gandrud | 269/302.1 |
| 3,166,027 | 1/1965 | Sprenzel | 425/183 |

Primary Examiner—Harold D. Whitehead
Attorney, Agent, or Firm—Clarence A. O'Brien; Harvey B. Jacobson

[57] ABSTRACT

A pie board having a disc provided with upper and lower, substantially parallel surfaces and a peripheral edge surface about which is arranged a clamping device for securing to the disc a flexible sheet disposed covering the upper surface of the disc. Suction cups, and the like, are mounted on the lower surface of the disc for permitting the disc to be adhered to a suitable surface supporting the pie board.

3 Claims, 5 Drawing Figures

PIE BOARD

BACKGROUND OF THE INVENTION

1. Field of the Invention

This invention relates generally to dough rolling apparatus, and particularly to a board to be employed for rolling and cutting dough as by a manual operation so as to simplify the process of making pies, and the like.

2. Description of the Prior Art

It is known that a cloth provides an ideal surface for the rolling of pastry dough, and the like. U.S. Pat. No. 2,183,767, issued Dec. 19, 1939 to E. S. Gandrud, discloses a framed pastry device which facilitates arrangement of a cloth for rolling of dough. While the aforementioned prior art device uses a substantially rectangular frame, it is also known to be advantageous to provide a circular, or disc-like, pastry board in order to facilitate cutting of rolled dough to fit a pie pan, and the like. Examples of such pastry boards are found in U.S. Pat. Nos. 2,230,828, issued Feb. 4, 1941 to H. E. Carr, 2,650,552, issued Sept. 1, 1953 to F. T. Wood, 2,868,145, issued Jan. 13, 1959 to C. E. Brooke, and 3,166,027, issued Jan. 19, 1965 to A. Sprenzel. In addition, the latter two mentioned patents disclose arrangements intended to prevent slipping of the board relative to the surface on which the board rests. This feature has become advantageous in recent years due to the increased use of smooth-surfaced materials such as those laminated plastic products sold under the trademark "Formica" for kitchen counter tops, and the like.

SUMMARY OF THE INVENTION

It is an object of the present invention to provide a pie board of simple yet rugged and reliable construction which facilitates the making of pie crusts, and the like.

It is another object of the present invention to provide a pastry board in which a flexible sheet is clamped to the board in a manner wherein the sheet may be quickly and easily removed for cleaning, and the like.

It is yet another object of the present invention to provide a pastry board that will not slip on a smooth-surfaced countertop.

These and other objects are achieved according to the present invention by providing a pie board having: a board provided with an upper surface and a continuous edge surface; a flexible sheet arranged over the upper surface of the board and extending beyond the edge surface of the board; and a clamping device for securing the flexible sheet to the edge surface of the board. Advantageously, the clamping device is an expansible device.

The board preferably includes a disc, and the flexible sheet is desirably circular and of a diameter larger than the disc. The expansible clamping device can include a clamping band wrapped around the edge surface of the disc, with a latch connected to ends of the band for expansibly biasing the ends of the band together. The latch advantageously is formed by a pair of lugs, each of the lugs being provided on a respective one of the ends of the band, a sleeve arrangeable over the ends of the band between the lugs, and a tension spring connected to the lugs and extending between same for biasing the ends of the band together while permitting expansion of the band.

The board, or more properly the part of the board in the form of a disc, preferably further includes a lower surface substantially parallel to the upper surface and provided with a plurality of suction cup assemblies for adhering to a surface supporting the board. In this manner, the board can be easily and reliably releasably affixed to even a smooth-surfaced countertop, and the like.

Each suction cup assembly advantageously includes a suction cup provided with a central aperture, a screw arranged in the central aperture, and a, for example, knurled cap nut fitted in an associated hole provided in the disc and arranged engaging the aforementioned screw for retaining the suction cup on the disc. As will be appreciated, the suction cup will have a gripping portion thereof arranged diverging away from the disc for attachment to the support surface.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 5 is a schematic, perspective view, similar to FIG. 4, but showing rolled dough being cut into the form of a pie crust, and the like.

DESCRIPTION OF THE PREFERRED EMBODIMENT

Figure 1:
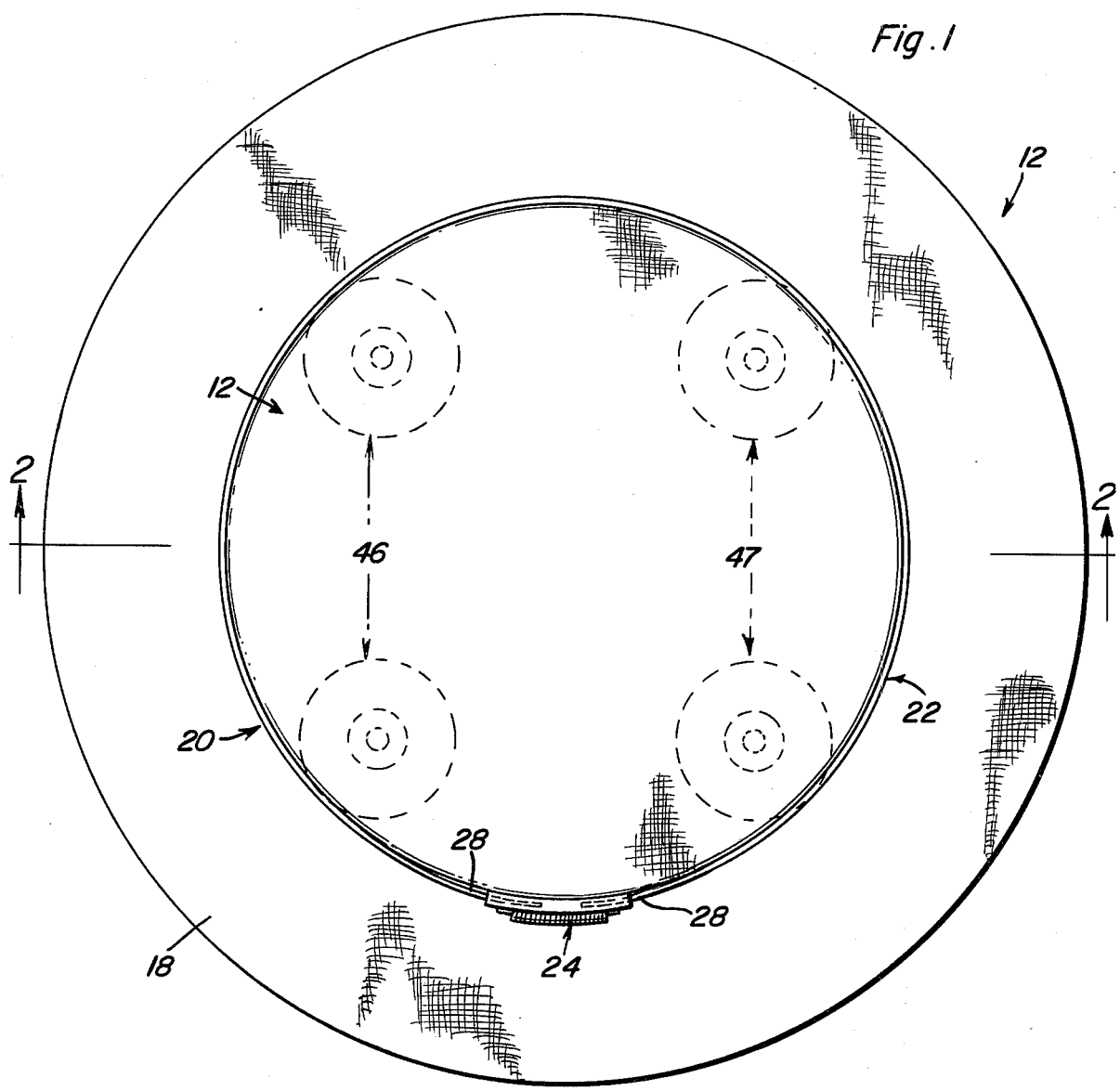
FIG. 1 is a top plan view showing a pie board according to the present invention.
Figure 2:
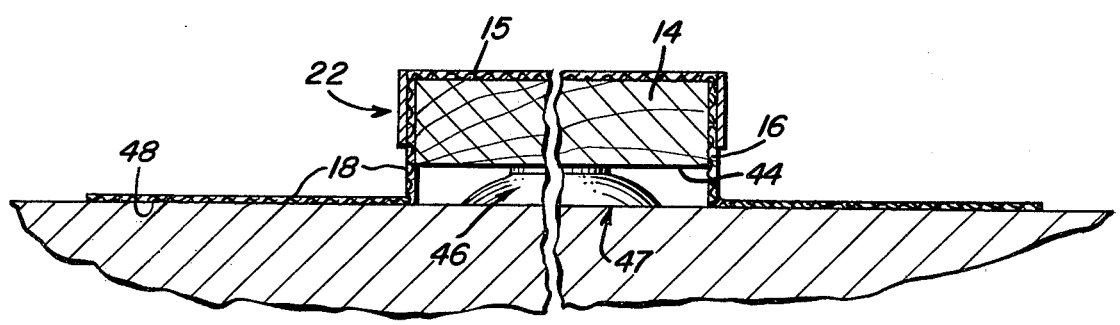
FIG. 2 is a fragmentary, sectional view taken generally along the line 2—2 of FIG. 1.
Figure 3:
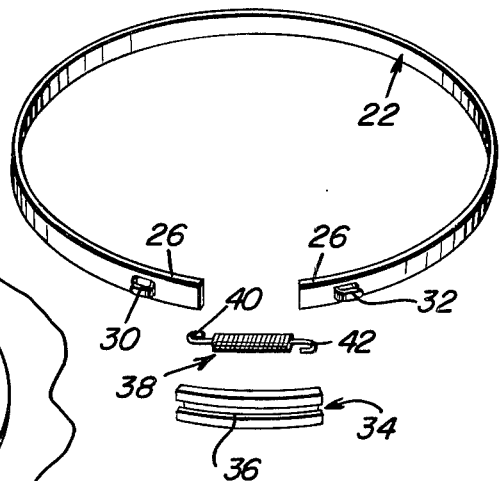
FIG. 3 is an exploded, perspective view, partly cut-away and in section, showing the pie board of FIGS. 1 and 2.

Referring now more particularly to FIGS. 1 through 3 of the drawings, a pie board 10 according to the present invention has a board 12 which advantageously includes, and is built around, a disc 14 having a substantially planar upper surface 15 and a continuous peripheral edge surface 16. Over the upper surface 15 and associated edge surface 16 is arranged a flexible sheet 18, which is advantageously a circular piece of cloth, or other material, of larger diameter than the diameter of disc 14. A clamping device 20, to be described in greater detail below, is arranged around edge surface 16 of disc 14 for securing sheet 18 to edge surface 16 as desired.

Clamping device 20 advantageously includes a clamping band 22 wrapped, in a removable manner, around edge surface 16. An expansion latch 24 is connected to ends 26 and 28 of band 22 for biasing ends 26 and 28 together while permitting the ends 26, 28 to move away from one another.

Latch 24 advantageously includes a pair of lugs 30 and 32, each of the lugs 30, 32 being provided on a respective one of the ends 26, 28 of band 22. A preferably split sleeve 34 is arrangeable over the ends 26, 28 of band 22 between lugs 30, 32 thereof for guiding ends 26, 28 relative to one another and edge surface 16. It will be appreciated that while sleeve 34 is desirably provided with slot 36 in order to better provide for expansion and contraction of the sleeve 34, it will be appreciated that a continuous flattened-tube, and the like, sleeve may be employed as sleeve 34 as desired. A conventional tension spring 38, and the like, is connected to lugs 30 and 32 as by hooks 40 and 42, respectively, so as to extend between the lugs 30, 32 for biasing ends 26, 28 of band 22 together while permitting expansion of band 22. In this manner, the hook forming lugs 30, 32 which may be stamped out of the material, possibly a metal, used for constructing band 22, spring 38, and sleeve 34 cooperate to form a latch 24 which will hold sheet 18 tightly and smoothly on disc 14 during dough rolling operations, and the like, but will quickly release for rapid and easy removal of sheet 18 from disc 14 when the rolling operation is completed.

Disc 14, and accordingly board 12, also is provided with a substantially planar lower surface 44, which is advantageously substantially parallel to surface 16, on which a plurality of suction cup assemblies 46 and 47 are mounted for adhering board 12 to a support surface 48, which may be a conventional countertop, cabinet top, and the like. Thus, it will be appreciated that disc 14 forms board 12 in conjunction with assemblies 46 and 47.

Each suction cup assembly 46, 47 advantageously includes a suction cup 50 provided with a central aperture 52 therethrough. A conventional screw 54 is arranged in the central aperture, and a, for example, conventional knurled cap nut is fitted in an associated hole 58 provided in disc 14. The knurling on cap nut 56 will, of course, facilitate the requisite close fit between nut 56 and the walls defining hole 58 in order to retain nut 56 in hole 58. Nut 56 is arranged threadingly engaging screw 54 for retaining suction cup 50 on disc 14. Of course, suction cup 50 will be arranged so as to have a gripping portion thereof diverging away from lower surface 44 of disc 14. While the number of suction cup assemblies 46, 47 employed to form board 12 may vary as desired, the illustrated four assemblies, two each of assemblies 46 and 47, has been found advantageous.

Figure 4:
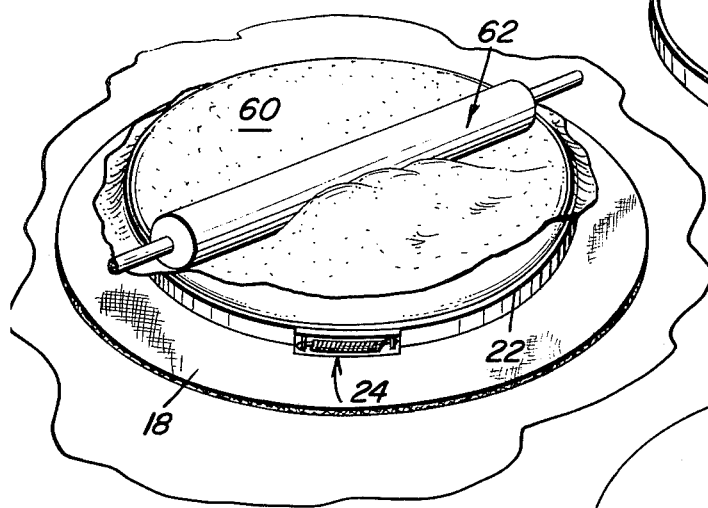
FIG. 4 is a schematic, perspective view showing dough being rolled on a pie board according to the present invention.
Figure 5:
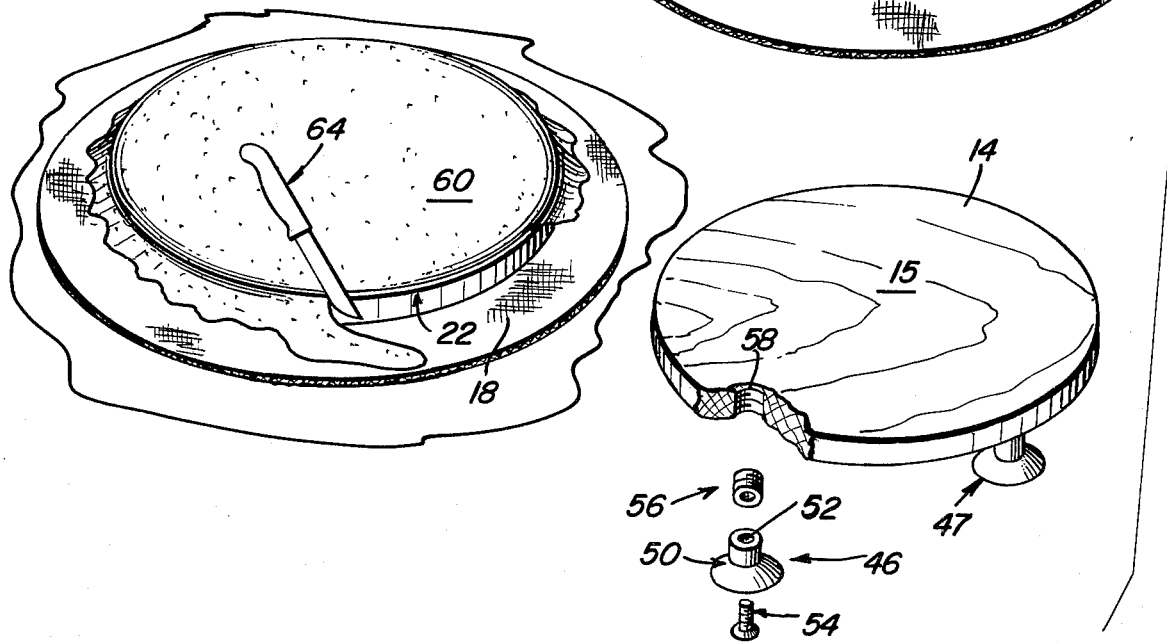

Referring now more particularly to FIGS. 4 and 5 of the drawings, FIG. 4 shows a mass of dough 60 arranged on pie board 10 for being rolled as by a conventional rolling pin 62. The pastry chef (not shown) will roll out the dough 60 in a conventional manner by manually operating rolling pin 62 until the dough is rolled to the predetermined desired thickness, which will cause the dough to hang over the edge of disc 14. It will be appreciated that the greater diameter of sheet 18 when compared to disc 14 will cause sheet 18 to form an apron onto which this excess dough will be pushed. FIG. 5 of the drawings shows the cutting step subsequent to rolling of dough 60 wherein a conventional knife 64, and the like, is used to cut excess dough 60 by using edge, and clamping band 22, as a guide for the knife 64. As can be readily appreciated from FIGS. 2 and 5 of the drawings, clamping band 22 is arranged wrapped around the peripheral edge surface 16 of board 12 so as to be flush with flexible sheet 18 disposed over the substantially planar upper surface 15 of board 12. In this manner, the associated upper edge of clamping band 22 will function as a cutting edge as shown in FIG. 5. Once cut, the pie crust formed from the cut dough 60 may be placed in a pie plate (not shown) ready for filling. The cut dough trimmings will, of course, drop onto the aforementioned apron formed by the outer peripheral portions of sheet 18, and sheet 18 may be conveniently removed by expanding band 22 and the droppings conveniently disposed of as circumstances permit. Sheet 18 may then be conveniently and quickly re-secured to disc 14 by letting clamping band 22 be drawn around the edge surface 16 of disc 14 by action of latch 24.

As will be appreciated from the above description and from the drawings, a pie board 10 according to the present invention affords a convenient, reliable, and repeatable device for rolling pie crusts and other pastry dough in such a manner as to encourage housewives, and the like, to engage in the marital art of baking pies and similar pastries.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A pie board comprising, in combination, a circular board having a substantially planar upper surface bounded by and extending fully between a continuous cylindrical outer peripheral edge, said board including a lower surface substantially paralleling said upper surface, a plurality of anti-slip depending support members support from said lower surface in widely horizontally spaced relation for supporting said board in spaced relation above a work surface upon which said support members rest, a flexible sheet overlying said upper surface and of a plan area, sufficiently greater than the plan area of said board and partially dependent on the effective heighth of said depending support members and the thickness of said board, to enable the marginal portions of said sheet all to extend downwardly over and below said peripheral edge and the lower surface of said board to a level appreciably below the lower extremities of said support members for defining a peripheral apron about said board over said work surface when said support members are supported therefrom, a resilient split cylindrical clamp band having adjacent opposite ends and snugly positionable about said board over the portion of said sheet extending downwardly over said peripheral edge and with the upper edge of said band substantially flush with the upper surface of the portion of said sheet disposed over said planar upper surface, and latch means operably connecting said opposite ends of said band for clamping said band over the portions of said sheet disposed over the peripheral edge of said board.

2. A structure as defined in claim 1, wherein said support member comprises a plurality of suction cup assemblies mounted on the lower surface for adhering to a support surface and releasably affixing the board to the support surface.

3. A structure as defined in claim 2, wherein each suction cup assembly includes a suction cup provided with a central aperture, a screw arranged in the central aperture, and a knurled cap nut fitted in an associated hole provided in the board and threadingly engaging the screw for retaining the suction cup on the board, the suction cup having a gripping portion arranged diverging away from the board.

* * * * *